United States Patent [19]

Suenaga et al.

[11] Patent Number: 5,069,887
[45] Date of Patent: Dec. 3, 1991

[54] METHOD OF REFINING NITROGEN TRIFLUORIDE GAS

[75] Inventors: Takashi Suenaga, Yamaguchi; Tukasa Fujii; Kobayashi, Yoshiyuki, both of Ube, all of Japan

[73] Assignee: Central Glass Company, Limited, Ube, Japan

[21] Appl. No.: 639,541

[22] Filed: Jan. 10, 1991

[30] Foreign Application Priority Data

Jan. 10, 1990 [JP] Japan .................................. 2-3112

[51] Int. Cl.$^5$ ...................... C01B 7/19; C01B 21/083; B01D 53/02
[52] U.S. Cl. .................................... 423/240 V; 55/71; 55/75; 423/406
[58] Field of Search ................ 423/240 S, 245.1, 406; 55/75, 71

[56] References Cited

U.S. PATENT DOCUMENTS

| | | | |
|---|---|---|---|
| 4,156,598 | 5/1979 | Woytek et al. | 423/406 |
| 4,193,976 | 3/1980 | Lileck et al. | 423/240 S |
| 4,543,242 | 9/1985 | Aramaki et al. | 423/406 |
| 4,933,158 | 6/1990 | Aritsuka et al. | 423/240 S |
| 4,948,571 | 8/1990 | Harada et al. | 423/240 S |

FOREIGN PATENT DOCUMENTS

| | | | |
|---|---|---|---|
| 2573324 | 5/1986 | France | 423/240 S |
| 61-287424 | 12/1986 | Japan | 423/240 S |
| 63-151608 | 6/1988 | Japan | 423/240 S |

*Primary Examiner*—Michael Lewis
*Assistant Examiner*—Brian M. Bolam
*Attorney, Agent, or Firm*—Fleit, Jacobson, Cohn, Price, Holman & Stern

[57] ABSTRACT

The invention provides a selective adsorption method for refining $NF_3$ gas containing $CF_4$ as impurity. At a temperature not higher than 10° C. the $NF_3$ gas is brought into contact with a crystalline and porous synthetic zeolite, which is substantially uniform in pore size and about 4.9 Å in effective pore size and is commerciallized under the name of molecular sieve 5A, on condition that the content of water of crystallinity in the synthetic zeolite is 1-10 wt. %, and preferably 6-10 wt. %. The synthetic zeolite efficiently adsorbs $NF_3$ with little adsorption of $CF_4$.

7 Claims, 1 Drawing Sheet

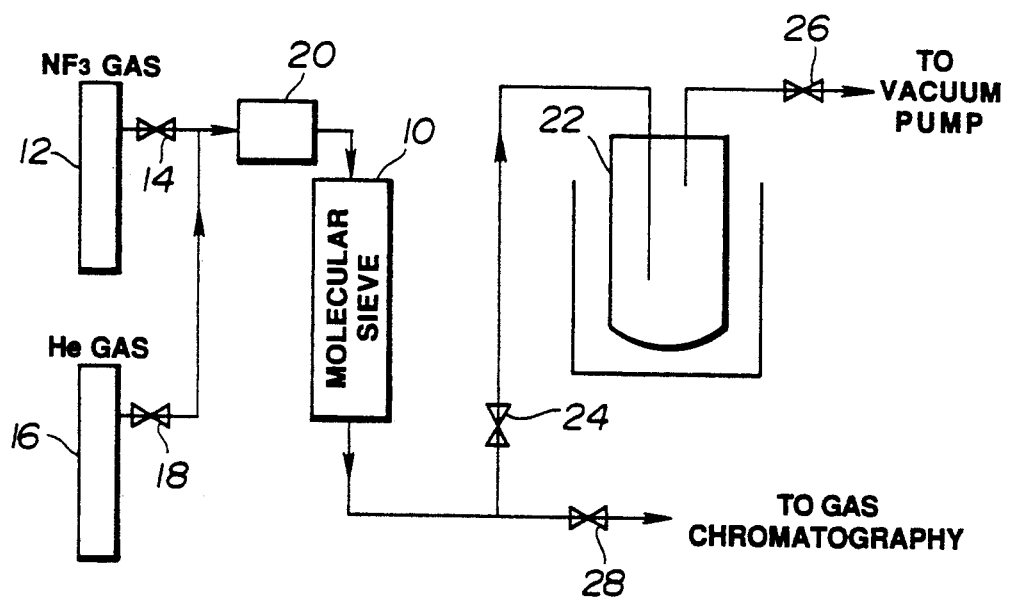

METHOD OF REFINING NITROGEN TRIFLUORIDE GAS

BACKGROUND OF THE INVENTION

This invention relates to a method of refining $NF_3$ gas containing $CF_4$ as impurity by using an adsorbent.

With an extensive development in the manufacture of semiconductors and related devices there is a growing demand for a wider selection of etching gases for the manufacture of semiconductors and cleaning gases for cleaning the manufacturing apparatus or the products.

Recently $NF_3$ gas is attracting attention as an etching gas for use in plasma etching because of the capability of greatly enhancing the etching rate and also because of leaving no solid residue on the surface of the etched material. In the case of using $CF_4$ gas as an etching gas there is a problem about a solid residue. Besides, $NF_3$ gas is useful as a cleaning gas for cleaning semiconductors and some parts of apparatus for manufacturing semiconductors by, for example, CVD process.

As shown in U.S. Pat. No. 4,543,242, $NF_3$ gas can be prepared safely and economically by the reaction of fluorine gas with ammonium cryolite, $(NH_4)_3AlF_6$. It is expected that $NF_3$ gas prepared by this method will be used for wide purposes in increasing quantities.

For use in the field of semiconductors, $NF_3$ gas of very high purity is required. When $NF_3$ gas is prepared by the aforementioned method it is inevitable that the obtained gas contains a very small amount of $CF_4$ which originates in fluorine gas used as a reactant. So, there is the need of separating $CF_4$ from the obtained $NF_3$ gas, but the separation is not easy. Both $NF_3$ and $CF_4$ are very low in chemical activity at normal temperature, and the boiling point of $CF_4$, $-128°$ C., is very close to the boiling point of $NF_3$, $-129°$ C. Therefore, at present the separation is carried out by a distillation method utilizing a difference between $NF_3$ and $CF_4$ in vapor pressures, but this method is very low in efficiency.

SUMMARY OF THE INVENTION

It is an object of the invention to provide a method of refining $NF_3$ gas containing $CF_4$ as impurity, by which method $CF_4$ can easily and efficiently be separated from $NF_3$ gas.

The present invention provides a method of refining a nitrogen trifluoride gas containing $CF_4$ as impurity, the method comprising the steps of (a) bringing the nitrogen trifluoride gas into contact with a crystalline and porous synthetic zeolite, which is substantially uniform in pore size and about 4.9 angstroms in effective pore size, on condition that the contents of water of crystallinity in the synthetic zeolite is in the range from 4 to 10 wt% and that the synthetic zeolite is maintained at a temperature not higher than 10° C. to thereby allow the synthetic zeolite to selectively adsorb $NF_3$ gas, (b) after the step (a) shielding the synthetic zeolite from any gas which contains $CF_4$, and (c) after the step (b) causing the synthetic zeolite to desorb refined $NF_3$ gas and collecting the desorbed $NF_3$ gas.

In this invention, "a crystalline and porous synthetic zeolite which is substantially uniform in pore size and about 4.9 Å in effective pore size" means a synthetic zeolite commerciallized under the name of "molecular sieve 5A". Hereinafter the term "molecular sieve 5A" will be used.

Currently available molecular sieves have chemical compositions represented by the formula $M_{2/n}O.Al_2O_3.aSiO_2.bH_2O$, where M is a metal cation, and n is the valence of the metal M. Molecular sieve 5A is represented by the following rational formula: $Ca_6[(AlO_2)_{12}(SiO_2)_{12}].xH_2O$.

Molecular sieve 5A has a substantially uniform pore size of about 4.2 Å, and, in respect of permeability to gas molecules, molecular sieve 5A has an effective pore size of about 4.9 Å.

In the present invention it is essential to use molecular sieve 5A as the adsorbent. By using molecular sieve or zeolite of a different class it is difficult to accomplish selective adsorption of only one of $NF_3$ and $CF_4$. If activated carbon, which is a popular adsorbent, is used both $NF_3$ and $CF_4$ are adsorbed.

We have paid attention to molecular sieve 5A which has an effective pore size close to the molecular sizes of $NF_3$ and $CF_4$ and have discovered that when the content of water of crystallinity in molecular sieve 5A is 1-10 wt% there is a great difference between the amount of adsorption of $NF_3$ and the amount of adsorption of $CF_4$ on condition that the molecular sieve is kept at an adequately low temperature. That is, the amount of adsorption of $NF_3$ is far larger than that of $CF_4$ which is simultaneously brought into contact with the molecular sieve, and in the case of using molecular sieve 5A in which the water content is 6–10 wt% $CF_4$ is hardly adsorbed. Therefore, by this method it is easy to refine $NF_3$ gas containing $CF_4$ to such an extent that the content of $CF_4$ becomes lower than 10 ppm which is the minimum limit of detection in a practical sense.

The content of water of crystallinity in molecular sieve 5A can be determined by heating the molecular sieve to measure the loss of weight. When the water content in molecular sieve 5A is lower than 1 wt% the molecular sieve efficiently adsorbs both $NF_3$ and $CF_4$ without exhibiting appreciable selectivity. When the water content is higher than 10 wt% both $NF_3$ and $CF_4$ are adsorbed in small and not very different amounts.

To accomplish the desired selective adsorption of $NF_3$, molecular sieve 5A should be kept at a temperature not higher than 10° C. When the temperature of the molecular sieve is higher than 10° C. the amount of adsorption of $NF_3$ greatly decreases so that the efficiency of the refining process is very low. From an economical point of view it is preferred to maintain the molecular sieve at a temperature in the range from $-50°$ C. to 10° C.

$NF_3$ gas refined by the method according to the invention is useful, for example, as an etching gas or a cleaning gas in the manufacture of semiconductors and also in widely different fields which need $NF_3$ gas of high purity.

BRIEF DESCRIPTION OF THE DRAWING

The single FIGURE is a diagrammatic illustration of an example of apparatus for the gas refining method according to the invention.

DESCRIPTION OF THE PREFERRED EMBODIMENTS

In the practice of the present invention it is convenient to introduce $NF_3$ gas containing $CF_4$ into a column packed with molecular sieve 5A.

By way of example the FIGURE shows the outline of a gas refining apparatus including a packed column 10 of molecular sieve 5A in which the water content is 1-10 wt%. A gas feed line connects a container 12 of NF$_3$ gas to be refined to the packed column 10 via a valve 14 and a flow rate controller 20. A container 16 of He gas is connected to the gas feed line via a valve 18 at a section upstream of the controller 20. A recovery line extends from the outlet of the packed column 10 to a cold trap 22 via a valve 24. A valve 26 is provided at the outlet of the trap 22. At a section upstream of the valve 24 a purge line provided with a valve 28 branches from the recovery line.

Before starting the refining operation the molecular sieve 5A in the column 10 is completely degassed, and the column 10 is cooled to a temperature below 10° C. At this stage all the valves in the illustrated apparatus are closed. Then the valve 18 is opened to introduce He gas into the packed column 10 until the He gas pressure reaches 1 atm. Preferably the valve 28 is opened thereafter in order to completely replace the air and any other gas possibly remaining in the apparatus by He gas. The cold trap 22 is cooled by liquid nitrogen.

Then the valve 18 is closed, and the valve 14 is opened to introduce NF$_3$ gas (containing CF$_4$) into the packed column 10 to allow the molecular sieve 5A to adsorb NF$_3$. After a while the valve 14 is closed, and the valve 18 is opened in order to purge the gases in the apparatus by He gas. Through the opened valve 28 the purged gas is passed to a gas chromatography to detect CF$_4$ contained in the purged gas. The purging operation must be continued until CF$_4$ is no longer detected in the purged gas. After that the valves 18 and 28 are closed, and the recovery line is connected to a vacuum pump. While the vacuum pump is operating the valve 26 is opened, and then the valve 24 is opened to thereby desorb NF$_3$ from the molecular sieve in the column 10 and introduce the liberated NF$_3$ gas into the trap 22 cooled by liquid nitrogen. Subsequently the temperature of the trap 22 is raised to gasify the refined and condensed NF$_3$, and the gasified NF$_3$ is transferred into a suitable container.

The following examples are illustrative of the invention, though the invention is not limited to these examples.

EXAMPLE 1

The apparatus shown in the FIGURE was used. The body of the column 10 was a stainless steel tube having an inner diameter of 28 mm and a length of 1000 mm. This column 10 was packed with 400 g of molecular sieve 5A in which the water content was 6 wt% and kept cooled at 0° C. The molecular sieve 5A was in the form of pellets having a diameter of about 1.6 mm.

In this example NF$_3$ gas in the container 12 had a purity of 99.98% by volume and contained 200 ppm of CF$_4$ and less than 10 ppm of air. After replacing air in the apparatus by helium gas, the NF$_3$ gas was continuously introduced into the packed column 10 at a constant flow rate of 2.0 l/min at a pressure of 1 atm, while the valve 28 was kept open. The gas passed through the valve 28 was analyzed by gas chromatography to measure the proportion of CF$_4$ to NF$_3$. When the proportion of CF$_4$ to NF$_3$ in the analyzed gas became equivalent to that in the gas in the container 12 the feed of the NF$_3$ gas to the column 12 was terminated on the assumption that the adsorption of NF$_3$ by the molecular sieve 5A had reached saturation. Then NF$_3$ gas remaining in the column 10 was purged by helium gas. After that the valves 14, 18 and 28 were closed, and the valves 24 and 26 were opened, and a vacuum pump was operated to suck NF$_3$ from the packed column 10 and collect the liberated NF$_3$ gas in the trap 22 which used a stainless steel container and was kept cooled by liquid nitrogen.

After the above refining process NF$_3$ gas was recovered from the cold trap 22 and analyzed by gas chromatography to find that the concentration of CF$_4$ was below the minimum limit of detection, i.e. lower than 10 ppm, and that the content of air was below 10 ppm. In the refining process the quantity of NF$_3$ adsorbed by the molecular sieve 5A in the column 10 was measured to be 4.43 liters, and the quantity of NF$_3$ gas recovered from the cold trap 22 was 4 liters. The recovery of NF$_3$ was 90.3%

EXAMPLE 2

The process of Example 1 was repeated to refine another NF$_3$ gas which had a purity of 99.94% by volume and contained 600 ppm of CF$_4$ and less than 10 ppm of air.

In the refined and recovered NF$_3$ gas the concentration of CF$_4$ was below 10 ppm, and the content of air was less than 10 ppm.

EXAMPLE 3

The process of Example 1 was repeated except that the water content in the molecular sieve 5A was changed to 4 wt%. The object of refining was the NF$_3$ gas used in Example 1.

In the refined and recovered NF$_3$ gas the concentration of CF$_4$ was 46 ppm, and the content of air was less than 10 ppm. In the column 22 the amount of adsorption of NF$_3$ gas per 100 g of molecular sieve 5A (containing 4 wt% of water) was 1.5 liter. In this case the recovery of NF$_3$ gas was 92%.

EXAMPLE 4

The process of Example 1 was repeated except that the water content in the molecular sieve 5A was changed to 1 wt%. The object of refining was the NF$_3$ gas used in Example 1.

In the refined and recovered NF$_3$ gas the concentration of CF$_4$ was 130 ppm, and the content of air was less than 10 ppm. In the column 22 the amount of adsorption of NF$_3$ gas per 100 g of molecular sieve 5A (containing 1 wt% of water) was 3.0 liters. In this case the recovery of NF$_3$ gas was 92.1%.

EXAMPLE 5

The process of Example 1 was repeated except that the water content in the molecular sieve 5A was changed to 10 wt%. The object of refining was the NF$_3$ gas used in Example 1.

In the refined and recovered NF$_3$ gas the concentration of CF$_4$ was below 10 ppm, and the content of air was less than 10 ppm. In the column 22 the amount of adsorption of NF$_3$ gas per 100 g of molecular sieve 5A (containing 10 wt% of water) was 0.2 liter. In this case the recovery of NF$_3$ gas was 91.5%.

What is claimed is:

1. A method of refining a nitrogen trifluoride gas containing CF$_4$ as impurity, the method comprising the steps of:
   (a) bringing said nitrogen trifluoride gas into contact with a crystalline and porous synthetic zeolite, which is substantially uniform in pore size and about 4.9 Å in effective pore size, on condition that the content of water of crystallinity in said synthetic zeolite is in the range from 4 to 10 wt% and that said synthetic zeolite is maintained at a temperature not higher than 10° C. to thereby allow said synthetic zeolite to selectively adsorb $NF_3$ gas;

(b) after step (a) shielding said synthetic zeolite from any gas which contains $CF_4$; and (c) after step (b) causing said synthetic zeolite to desorb refined $NF_3$ gas and collecting the desorbed refined $NF_3$ gas.

2. A method according to claim 1, wherein said content of water of crystallinity is in the range from 6 to 10 wt%.

3. A method according to claim 1, wherein said temperature is in the range from about $-50°$ C. to 10° C.

4. A method according to claim 1, wherein at step (a) said nitrogen trifluoride gas is brought into contact with said synthetic zeolite at normal pressure.

5. A method according to claim 1, wherein the contact at step (a) is made by passing said nitrogen trifluoride gas through a column packed with said synthetic zeolite.

6. A method according to claim 1, wherein said synthetic zeolite is in the form of pellets.

7. A method according to claim 1, wherein said synthetic zeolite is in the form of a powder.

* * * * *